Jan. 20, 1959 A. L. KOUP 2,869,662
DETACHABLE WHEEL ASSEMBLY DRIVE UNIT
Filed Feb. 14, 1956 3 Sheets-Sheet 1
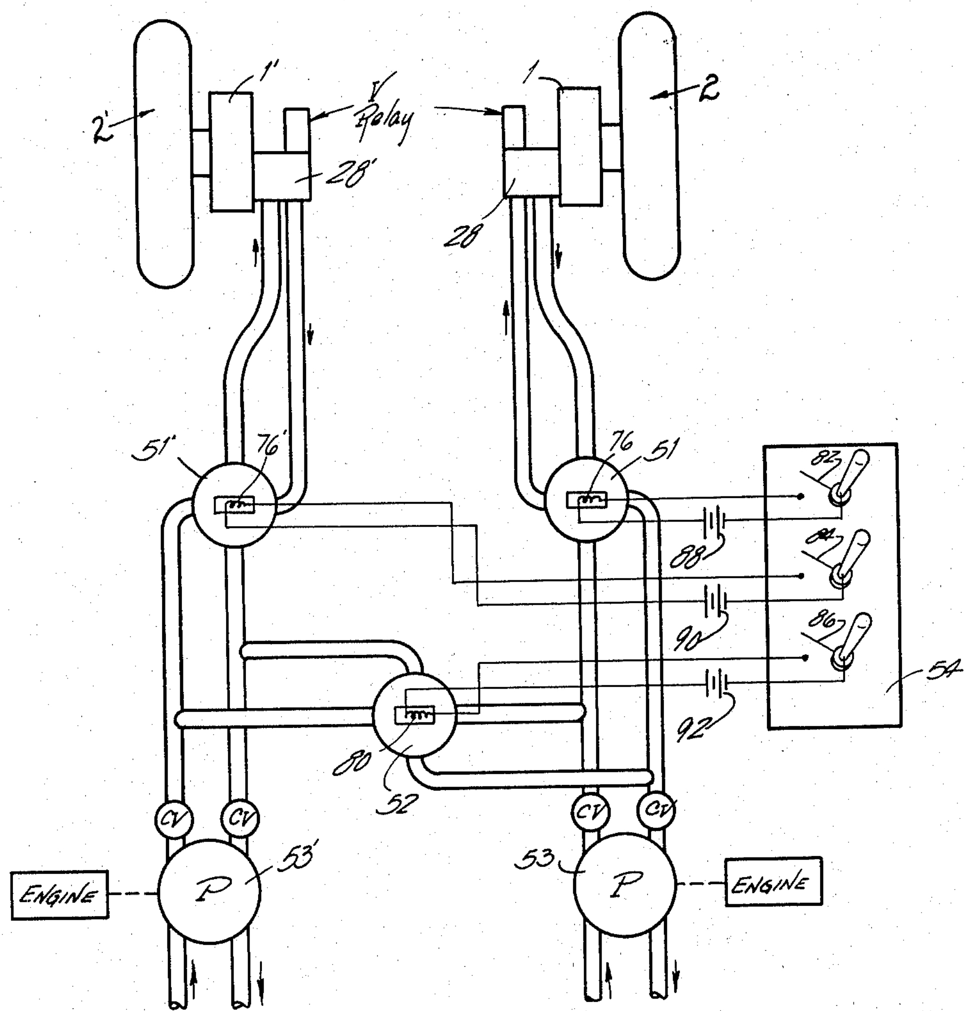
INVENTOR.
ALFRED L. KOUP
BY
ATTORNEYS INVENTOR.
ALFRED L. KOUP
BY J. Schmitt
Arthur W. Collins
ATTORNEYS

DETACHABLE WHEEL ASSEMBLY DRIVE UNIT

Filed Feb. 14, 1956 3 Sheets-Sheet 3

INVENTOR.
ALFRED L. KOUP
BY Schmitt
Arthur W. Collins
ATTORNEYS 2,869,662
Patented Jan. 20, 1959

2,869,662

DETACHABLE WHEEL ASSEMBLY DRIVE UNIT

Alfred L. Koup, Stepney Depot, Conn., assignor, by mesne assignments, to the United States of America as represented by the Secretary of the Navy Application February 14, 1956, Serial No. 565,520

7 Claims. (Cl. 180—55)

This invention relates to taxi-drive systems for aircraft, such as helicopters.

An object of this invention is to provide a taxi-drive system for the wheels of a helicopter type aircraft which can operate in a forward and a reverse direction.

Another object of this invention is to provide a drive system for each wheel of an aircraft with the systems interconnected for independent operation or for dependent operation.

Still another object of this invention is to provide a taxi-drive and steering system wherein the system is electrically controlled.

These and other objects of the invention will be readily apparent to those skilled in the art from a perusal of the following description and drawings wherein, Figure 1 is a schematic layout of the drive system and the associated controls.

Figure 2 is a cross-sectional view of the taxi-drive system, and

Figure 4:
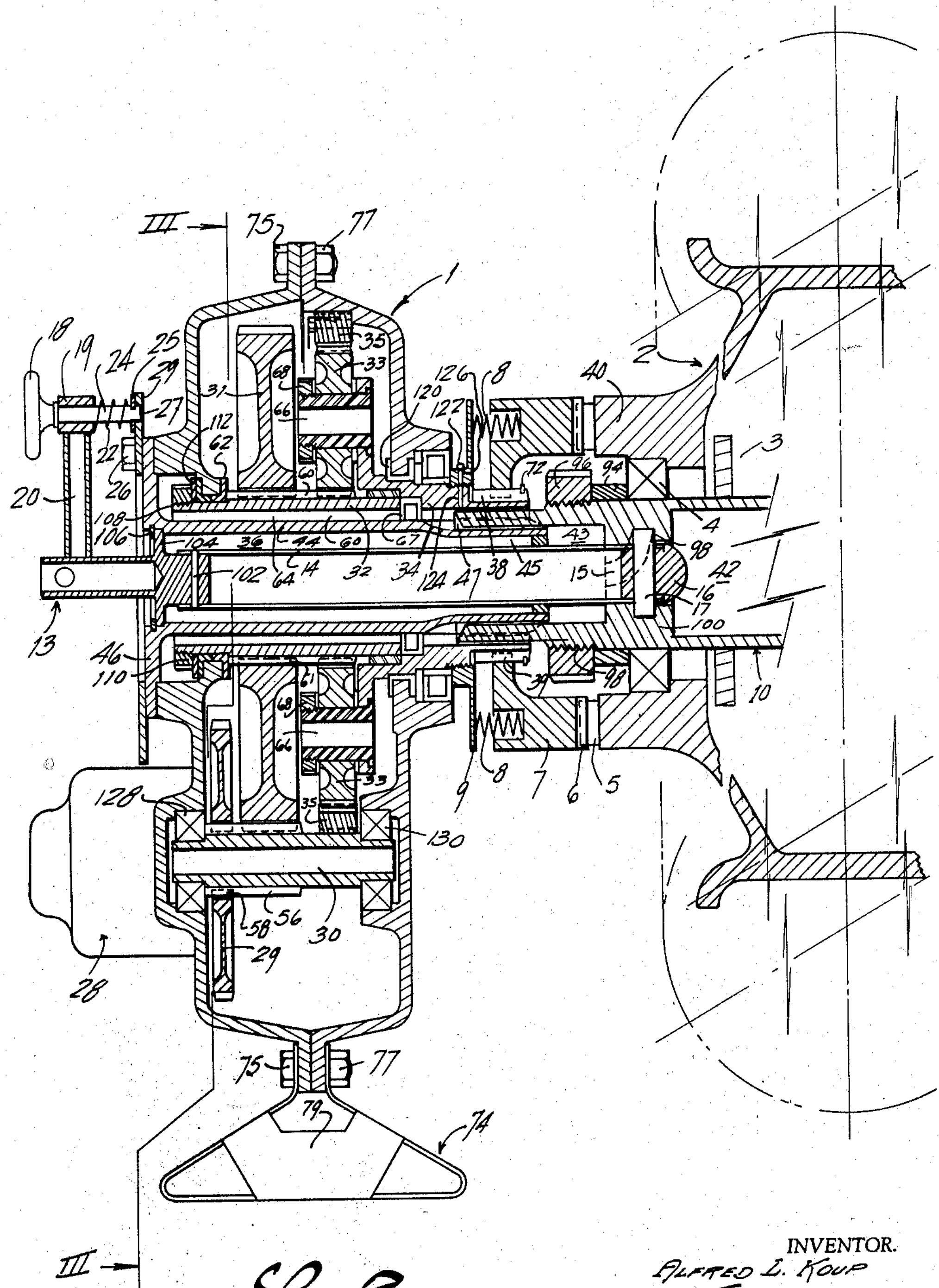

In the drawing (Fig. 2), a two-part casing 1 encloses the drive unit of the taxi-drive system. Mounted exteriorly of the drive unit is the wheel or wheel structure 2 having an integral hub 40 and which includes a brake mechanism 3. The wheel structure 2 is mounted on a bearing 4 for rotation about the fixed axle 10 having an axial bore 42 therein which includes a reduced diameter portion 43 provided with splines 45 on the inner periphery thereof. Teeth 5 of a positive coupling are formed on one face of the wheel hub 40 and are shown in driving relation with corresponding teeth 6 on the face plate 7. Springs 8 bear against the face plate 7 and a backing plate 9, the springs 8 thereby maintaining the coupling teeth in constant mating relationship.

To place the coupling teeth 5 and 6 in or out of a mating relationship and to provide a means for attaching the drive unit to the axle 10, a cam means or cam system is provided. The cam means is integrally formed with axle 10 and is carried within the axial bore 42 thereof. Structurally, the cam means is comprised of a radially inwardly extending wall portion 100 of the axle 10 which defines an elongated passage 98 extending substantially longitudinally of axial bore 42. A pair of opposed and helically inclined cam slots 15 (only one shown) are formed in the wall of elongated passage 98 with one end of each cam slot terminating in reduced diameter portion 43 of axial bore 42. Riding in the cam slots 15 are the ends of a pin 17 mounted on a tubular sleeve 14 and secured to the sleeve 14 by an end cap 16. Sleeve 14 extends transversely of the casing 1 and one end thereof is secured by a pin 102 to a lock shaft unit 13 having a flange 104 intermediate the ends thereof. The flange 104 and thus sleeve 14 are mounted for rotation within the bore 36 of a tubular member 44 which terminates in a flange 46 at one end thereof that is secured to the casing 1 by bolts 26 (only one shown). A retaining ring or washer 106 engages flange 104 and precludes axial movement of sleeve 14. Tubular member 44 is also provided with splines 47 thereon which engage axle splines 45 as will be more fully discussed hereinafter.

Radiating outward from lock shaft unit 13 are three radial arms 20 (only one shown) on one of which is mounted a sleeve 19. The sleeve 19 accommodates a spindle 24 attached at one end to a wheel 18. A washer 25 is carried on the opposite end of spindle 24 and restrains a spring 22 between itself and sleeve 19.

Figure 3:
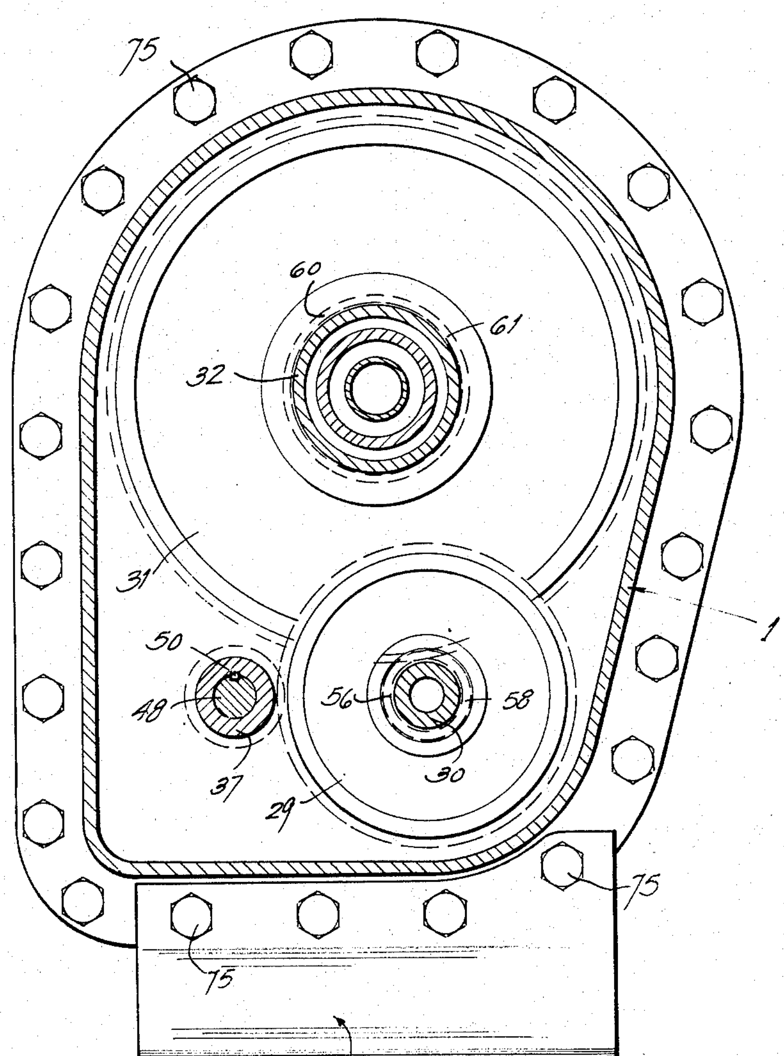
Figure 3 is a section taken along the line III—III of Figure 2.

Power for the drive unit is supplied by a rotary fluid motor 28 (Fig. 2) which is carried by the casing 1 and attached thereto by any suitable means (not shown). Fluid motor 28 is provided with an output shaft 48 (Fig. 3) which extends transversely of casing 1 and carries a pinion 37, the pinion 37 being rigidly connected to the output shaft 48 by a key 50. Pinion 37 is adapted to mesh with a gear 29 carried by a geared shaft 30 rotatably mounted in a pair of opposed bearings 128 and 130 carried by casing 1. Shaft 30 is provided with gear teeth 56 thereon which mesh with corresponding inner peripheral teeth 58 on gear 29 and any rotation of gear 29 by pinion 37 will thereby result in a simultaneous rotation of shaft 30.

Geared shaft 30 is adapted to mesh with and drive a relatively large diameter gear 31 which is carried by a sun gear 32. The gear teeth 60 on sun gear 32 mesh with internal teeth 61 on gear 31 to establish a driving connection between gear 31 and sun gear 32 whereby rotation of gear 31 by geared shaft 30 produces a simultaneous rotation of sun gear 32. A bearing 62 carried by casing 1 supports sun gear 32 for rotation about a fixed axis extending substantially parallel to tubular sleeve 14, and sun gear 32 is provided with an enlarged axial bore 64 therein to accommodate the passage therethrough of tubular member 44. Sun gear 32 is also threaded at 108 and carries a threaded nut 110 which abuts a washer 112 to thereby preclude axial movement of the sun gear.

Sun gear 32 is adapted to mesh with and drive a plurality of planet gears 33 (only two shown) which in turn mesh with a ring gear 35 carried by casing 1 and rigidly connected thereto by any suitable means (not shown) such as welding or a plurality of splines. The planet gears 33 are adapted to carry and drive a rotatable carrier member 34 which is supported for rotation on a bearing 67 mounted on tubular member 44 and a bearing 120 carried by casing 1. Carrier member 34 is secured to each of the planet gears 33 by a tubular bolt 66 extending through each of the planet gears, and nuts 68 threaded on each of the tubular bolts 66 hold the planet gears 33, the bolts 66 and the carrier member 34 in assembled engagement.

Carrier member 34 extends substantially transversely of casing 1 and a portion thereof projects externally of the casing. The externally projecting portion is splined at 38 and is adapted to slideably receive the correspondingly splined inner periphery 39 (shown in dotted lines) of the face plate 7. Backing plate 9 is threaded on the carrier member 34 at 70 and a cotter pin 122 is carried in aligned passages 124 and 126 in the carrier member 34 and the backing plate 9, respectively, to provide a positive locking means therebetween. The splines at 38 and 39 function as a positive driving connection between the carrier member 34 and the plate 7 carried thereby and the rotation of the carrier member 34 will thus effect a simultaneous rotation of face plate 7 and backing plate 9 to thereby provide a driving means for the wheel structure 2. Carrier member 34 also has a washer or retainer ring 72 mounted thereon to limit the axial movement of face plate 7 to the right as viewed in Figure 2.

Casing 1 has attached thereto a substantially triangular-shaped foot or base member 74 which functions as a stand or the like to hold the drive unit in an upright position (the position as shown in Figure 2) when it is detached from the axle 10. It is desirable to retain the drive unit in an upright position when not being used in order to prevent damage to or misalignment of some of the components thereof such as wheel 18, cam pin 17, end cap 16 and motor 28. Casing bolts 75 carrying nuts 77 rigidly secure the base member 74 to the casing 1 although it will be appreciated that any other suitable type of securing means may be utilized. A brace 79 is carried by the base member 74 to prevent bending thereof under load.

The unit, above described, is attached to either wheel of the landing gear (not shown) with a similar unit attached to the opposite wheel (28 and 28' of Fig. 1). Each motor 28 or 28' has connected thereto a supply and return line from a pump 53 or 53' and in which lines is connected a 4-way valve 51 or 51'. Solenoids or the like 76 and 76' are associated with the valves 51 and 51', respectively, to control the operation thereof. Also connecting each pair of supply and return lines is a dual shut-off valve 52 having a solenoid or the like type operator 80 associated therewith.

The control panel 54 of the three control valves is of the three switch type. Thus, switches 82 and 84 on the panel 54 control the 4-way valves 51, 51' while switch 86 controls the dual shut-off valve 52. Batteries 88, 90 and 92 provide an electrical source for the switching circuits.

The pumps 53 and 53' are constant delivery pumps and are shown as being directly driven by separate engines. Thus, in ordinary operation, control of a helicopter engine also results in a direct change in the output of the pump.

*Operation*

To attach the drive unit to the axle 10 of a wheel 2, arm 20 and thus sleeve 14 are first rotated at least 90° in a counterclockwise direction (viewing Fig. 2 from left to right). The drive unit is then elevated to a position where the splines 45 and 47 are in registry and the ends of pin 17 are aligned with the two opposed and helically inclined cam slots 15 in the wall of elongated passage 98. Arm 20 is then rotated in a clockwise direction to move the ends of pin 17 inwardly along cam slots 15 and thereby move or pull the drive unit in toto toward the wheel structure 2. When the ends of pin 17 traverse the entire length of cam slots 15 and become seated on the inner ends thereof, the drive unit will have been moved sufficiently close to the wheel structure 2 to effect meshing of the coupling teeth 5 and 6 and thereby establish a positive driving connection between the drive unit and the wheel structure 2. When a positive drive connection is obtained, pin 24 will be opposite its mating port 27 in a plate 29 which is fixedly mounted on the casing 1 by bolt 26. Wheel 18 is then released allowing spring 22 to force the locking pin 24 into the mating port 27. The drive unit is now locked in a drive position with coupling teeth 5 and 6 in mesh. No rotation of sleeve 14 and axle 10 results since the wheel structure 2 revolves about its bearing 4. Springs 8 bear against plate 7 causing a constant mesh of coupling teeth 5 and 6 to thereby eliminate any slack or end play therebetween.

The rotary fluid motor 28 drives the carrier member 34 through the gear train described above. Since the carrier member 34 is attached to plate 7 by splines 38 and 39, drive from the fluid motor 28 results in a drive of the plate 7 and wheel structure 2.

Control of the taxi-drive is obtained through control of either the fluid motor or the hydraulic pumps. In the fluid motor control, a 4-way valve is positioned in each motor circuit; one valve is controlled by switch 82 and the other by switch 84. Thus, by manipulating the switches 82 and/or 84, the direction of rotation of the wheels can be controlled as each taxi-drive system can be operated in either direction by reversing the position of the 4-way valves.

Switch number 86 operates the shut-off valve 52 which can be kept in the open or closed position. During one engine operation, the valve is opened and the pump associated with that engine will operate both circuits and both fluid motors. As illustrated, either engine may be cut off and the other will operate the circuits with the shut-off valve open.

During two engine operation, valve 52 may be opened or closed. If open, the operation of each motor is related to the other since the pressure and return lines are interconnected. If closed, each motor is independent of the other and steering is accomplished by varying the trottle setting of either engine. Since the pump is directly connected to the engine, a change in the throttle setting of the engine produces a direct change in the output of the pump.

The recommended method for steering is to vary the throttle settings of the engines with the dual shut-off valve closed. Since both wheels are now operating independently of each other, the plane can be made to taxi directly forward or in reverse and also perform turns to the right or left at all speeds and turning radii. Turning may also be performed by braking one wheel to a complete or partial stop and the helicopter will turn using the braked wheel as a pivot. In the event that the braking turn is utilized, a relief valve on the braked wheel discharges preventing a build-up of pressure in the system.

Obviously many modifications and variations of the present invention are possible in the light of the above teachings. It is therefore to be understood that within the scope of the appended claims the invention may be practiced otherwise than as specifically described.

What is claimed is:

1. In combination, a wheel assembly and a detachable drive means therefor comprising an axle having an axial bore therein, cam means carried in said axial bore in said axle, bearing means carried by said axle, wheel means carried by said bearing means for rotation about said axle and provided with coupling teeth thereon, a casing, tubular sleeve means operatively connected to said casing and being rotatable relative thereto, motor means carried by said casing, reduction gearing means carried within said casing and being drivingly connected to said motor means, carrier means operatively connected to said reduction gearing means and rotatably driven thereby, plate means carried by said carrier means for rotation therewith and provided with couplnig teeth thereon adapted to coact with said coupling teeth on said wheel means, and cam follower means carried by said tubular sleeve means and being cooperable with said cam means in said axial bore for effecting attachment of said casing to said axle and establishing engagement of said coupling teeth to thereby provide a positive driving connection between said drive unit and said wheel assembly.

2. In combination, a wheel assembly and a detachable drive unit therefor comprising an axle having an axial bore therein, cam means in said axial bore having a pair of opposed and helically inclined cam slots therein, bearing means carried by said axle, a wheel carried by said bearing means for rotation about said axle, a hub carried by said wheel and provided with coupling teeth thereon, a casing, a tubular sleeve carried by said casing and being rotatable relative thereto, said tubular sleeve having a portion projecting externally of said casing, motor means carried by said casing, reduction gearing means within said casing including a sun gear, a ring gear and a plurality of rotatable planetary gears, means associated with said motor means for establishing a driving connection between said motor means and said reduction gearing means, a carrier member operatively connected to said planetary gears for rotation therewith and provided with a portion projecting externally of said casing, plate means carried by said externally projecting portion of said carrier member and being rotatable therewith and slideable therealong, coupling teeth carried by said plate means and being cooperable with said coupling teeth on said wheel hub, a pin carried by said externally projecting portion of said tubular sleeve and having the ends thereof slideably received in said cam slots, and means operatively connected to said tubular sleeve for imparting rotation thereto to move the ends of said pin along said cam slots and move said tubular sleeve axially of said bore within said axle to thereby move said casing toward said wheel assembly and establish a positive driving engagement between the coupling teeth on said plate means and the coupling teeth on said wheel hub.

3. The combination wheel assembly and detachable drive unit therefor claimed in claim 2 further including locking means operatively associated with said tubular sleeve for preventing the rotation thereof after the establishment of said driving engagement between said coupling teeth to thereby prevent axial separation of said coupling teeth and relative movement between said casing and wheel assembly.

4. The combination wheel assembly and detachable drive unit therefor claimed in claim 2 further including a backing plate carried by said externally projecting portion of said carrier member, resilient means separating said backing plate and said plate means and being operable to constantly urge said coupling teeth on said plate means into driving engagement with said coupling teeth on said wheel hub, and ring means carried by said externally projecting portion of said carrier member for limiting the slideable movement of said plate means therealong in one direction.

5. The combination wheel assembly and drive unit therefor as claimed in claim 4 wherein said backing plate and said plate means are splined and threaded, respectively, to said externally projecting portion of said carrier member.

6. The combination wheel assembly and drive means therefor claimed in claim 2 wherein said means for establishing a driving connection between said motor means and said reduction gearing means further includes a pinion driven directly by said motor means, a geared shaft mounted for rotation within said casing, a gear carried by said geared shaft and adapted to mesh with said pinion, and a relatively large gear carried by said sun gear and adapted to mesh with said geared shaft to thereby provide a driving connection between said geared shaft and said sun gear.

7. In combination, a wheel assembly and a detachable drive means therefor comprising an axle having a bore therein, cam means in said axle bore, bearing means carried by said axle, wheel means carried by said bearing means and provided with coupling teeth thereon, casing means, sleeve means operatively connected to said casing means and being rotatable relative thereto, motor means associated with said casing means, reduction gearing means carried within said casing means and being driven by said motor means, means associated with said reduction gearing means and being provided with coupling teeth thereon cooperable with said coupling teeth on said wheel means, and cam follower means carried by said sleeve means and being cooperable with said cam means for effecting attachment of said casing means to said axle and establishing engagement of said coupling teeth to thereby provide a positive driving connection between said drive unit and said wheel assembly.

References Cited in the file of this patent

UNITED STATES PATENTS

| | | |
|---|---|---|
| 1,041,010 | Brownell | Oct. 15, 1912 |
| 1,514,872 | Starr | Nov. 11, 1924 |
| 2,065,598 | McCoy | Dec. 29, 1936 |
| 2,126,255 | Hacker | Aug. 9, 1938 |
| 2,257,108 | Cornwell | Sept. 30, 1941 |
| 2,381,842 | Schwend | Aug. 7, 1945 |
| 2,446,242 | Orshansky | Aug. 3, 1948 |

FOREIGN PATENTS

| | | |
|---|---|---|
| 242,777 | Switzerland | Nov. 16, 1946 |
| 600,857 | France | Feb. 17, 1925 |
| 14,198 | Great Britain | Aug. 6, 1892 |